United States Patent
Bauman et al.

(10) Patent No.: US 7,032,079 B1
(45) Date of Patent: Apr. 18, 2006

(54) SYSTEM AND METHOD FOR ACCELERATING READ REQUESTS WITHIN A MULTIPROCESSOR SYSTEM

(75) Inventors: Mitchell A. Bauman, Circle Pine, MN (US); R. Lee Gilbertson, Minneapolis, MN (US); Jerome G. Carlin, St. Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 304 days.

(21) Appl. No.: 10/318,678

(22) Filed: Dec. 13, 2002

(51) Int. Cl.
*G06F 12/00* (2006.01)

(52) U.S. Cl. ........................ 711/141; 711/146; 711/147

(58) Field of Classification Search ............... 711/141, 711/144, 146, 147
See application file for complete search history.

(56) References Cited

U.S. PATENT DOCUMENTS 5,887,138 A * 3/1999 Hagersten et al. .......... 709/215
6,622,214 B1 * 9/2003 Vogt et al. .................. 711/141
2002/0087807 A1 * 7/2002 Gharachorloo et al. ..... 711/141
2002/0087811 A1 * 7/2002 Khare et al. ................ 711/146
2002/0124145 A1 * 9/2002 Arimilli et al. ............. 711/146

* cited by examiner

Primary Examiner—Woo H. Choi
(74) Attorney, Agent, or Firm—Beth L. McMahon; Charles A. Johnson; Mark T. Starr

(57) ABSTRACT

A system and method for managing memory data within a data processing system is disclosed. A main memory is provided to store data signals. When the main memory receives a request to read data signals, the main memory determines whether an updated copy of the requested data signals may be stored within some other storage device within the system. If so, the main memory issues a snoop request to this other storage device to cause any updated copy of the requested data to be returned to the main memory. In addition, the main memory reads the requested data signals from its data store. This data will be used to satisfy the read request if an updated copy of the data signals is not returned to the main memory in response to the snoop request. Otherwise, the updated copy is provided to fulfill the request.

21 Claims, 3 Drawing Sheets

SYSTEM AND METHOD FOR ACCELERATING READ REQUESTS WITHIN A MULTIPROCESSOR SYSTEM

FIELD OF THE INVENTION

The present invention relates generally to shared memory multiprocessor systems, and more particularly to a system and method for providing memory data to a requester in an accelerated manner in a multiprocessor system.

BACKGROUND OF THE INVENTION

In many multiprocessor systems, all of the processors access a common memory, referred to as the main memory. Typically, the main memory is not capable of supplying data and instructions to multiple processors at adequate speeds. To compensate for the speed deficiencies of main memory, caches are usually incorporated. Caches are small high-speed memories located between main memory and a processor, and that are updated to contain memory data that was recently requested by the processor. The processor can generally obtain a copy of memory data much more quickly from its cache than from the main memory.

In multiprocessor systems, multiple copies of a particular data item may reside within multiple caches at any given time. Because of this, a memory coherency protocol must be used to ensure that all processors within the system operate from the same, most recent, copy of the memory data. This type of protocol allows data to be shared among many devices for read-only purposes. Before a device can modify the data, it must gain exclusive access to the data. In this case, all other cached copies of the data are marked as unusable, or "invalidated". After a device gains exclusive access to data, the device may, but is not required to, modify the data. When a device relinquishes exclusive access rights, any updated copy of the data must be stored back to the main memory, or provided to another cache within the system.

In a multiprocessor system of the type discussed above, gaining access to data may be time-consuming. First a requester such as an instruction processor or I/O module makes a request for the data from its associated caches. If a cache miss occurs, the request must be forwarded to the main memory. The main memory then determines whether it has the most recent copy of the requested data. In some cases, another cache in the system may store another, more recent copy of the data. The main memory therefore makes a request to this other cache to prompt return of any such copy. If the cache has such a copy, it may be forwarded to the requester. If, however, the cache does not have an updated copy, the main memory must again be accessed to obtain the data that will be returned to the requester. Thus, when a cache memory that may have an updated data copy is found to not store such a copy after all, two references to main memory are required to satisfy the request. This adds latency to the request path, and decreases overall system throughput.

What is needed, therefore, is an improved system and method for returning data to a requester in an accelerated manner.

SUMMARY OF THE INVENTION

The current invention provides a system and method for managing memory data. A main memory is provided to store data signals. Multiple additional storage devices such as cache memories are coupled to the main memory to store data signals retrieved from the main memory. When a processor requires access to data signals, it first makes a request to one or more of its cache memories. If none of these cache memories stores the requested data signals, the request is forwarded to the main memory.

When the main memory receives a read request, a reference is made to a directory within the main memory. The directory is a storage device that stores state and location information for each addressable unit of data signals stored within the main memory. In the current embodiment, an addressable unit of data signals is referred to as a "cache line", wherein each cache line includes 128 bytes of data signals. In an alternative embodiment, any other cache line size may be utilized.

If the directory indicates that one of the cache memories may store an updated copy of the requested data signals, a snoop request is issued to that cache to cause any updated copy to be returned to the main memory. In addition to issuing this snoop request, the main memory reads the requested data signals from its data store. These signals, which are temporarily stored within a storage device within memory, will be used to satisfy the read request if an updated copy of the data signals is not returned to the main memory. If the updated copy of the data signals is returned to the main memory, however, this updated copy is provided to satisfy the read request and the temporarily stored copy is discarded.

The current invention provides a mechanism for allowing a read request to be satisfied after a snoop request has been completed without having to first read the requested data signals from the data store. This is true regardless of whether an updated data copy was returned to main memory in response to the snoop request. This reduces response time, and increases system throughput.

In one embodiment of the invention, a data processing system is disclosed. The data processing system includes a main memory, a requester coupled to the main memory to make a request for data signals stored in the main memory, and at least one storage device coupled to the main memory. The system further includes a circuit to temporarily buffer the data signals after the data signals are retrieved from the main memory. The circuit determines whether any of the at least one storage device stores an updated copy of the data signals, and if so, the circuit obtains and provides the updated copy to the requester. Otherwise the data signals retrieved from the main memory are returned to the requester.

According to another embodiment, the invention comprises a data processing system including a requester coupled to a first storage device. The system further includes a second storage device coupled to the first storage device to store data signals that were retrieved from the first storage device in response to a request by the requester. A circuit coupled to the second storage device determines if an updated copy of the stored data signals exists within the data processing system, and if so, provides the updated copy to the requester. Otherwise, the circuit provides the stored data signals to the requester.

In yet another embodiment, a method of managing data signals stored within a storage device of a data processing system is disclosed. The method comprises making a request for ones of the data signals, retrieving the requested data signals from the storage device, and temporarily storing the requested data signals. The method further includes determining whether an updated copy of the requested data signals exists, and in response to the request, providing the updated copy if the updated copy exists, otherwise, providing the requested data signals that were temporarily stored.

According to still another aspect of the invention, a data processing system is disclosed comprising a main memory to store data signals, multiple cache memories coupled to the main memory to store any of the data signals retrieved from the main memory, and a requester coupled to the main memory to request ones of the data signals. The invention further comprises a storage device coupled to the main memory, wherein the requested data signals are retrieved from the main memory and stored in the storage device. A snoop request circuit is coupled to the main memory to make a request to one of the multiple cache memories to return any updated copy of the requested data signals. A response circuit is coupled to the storage device to provide to the requester any returned updated copy of the requested data signals. If no updated copy is returned, the circuit instead provides the requested data signals stored by the storage device.

Also disclosed is a data processing system comprising data storage means for storing data signals, requesting means for making a request to cause ones of the data signals to be retrieved from the data storage means, buffer means for storing the retrieved data signals, means for retrieving any valid modified copy of the retrieved data signals, and response output means for providing the valid modified copy to the requesting means. If the valid modified copy does not exist, the response output means provides the retrieved data signals stored by buffer means to the requesting means.

Other scopes and aspects of the current invention will become apparent from the following description and accompanying drawings.

DETAILED DESCRIPTION OF THE DRAWINGS

Figure 1:
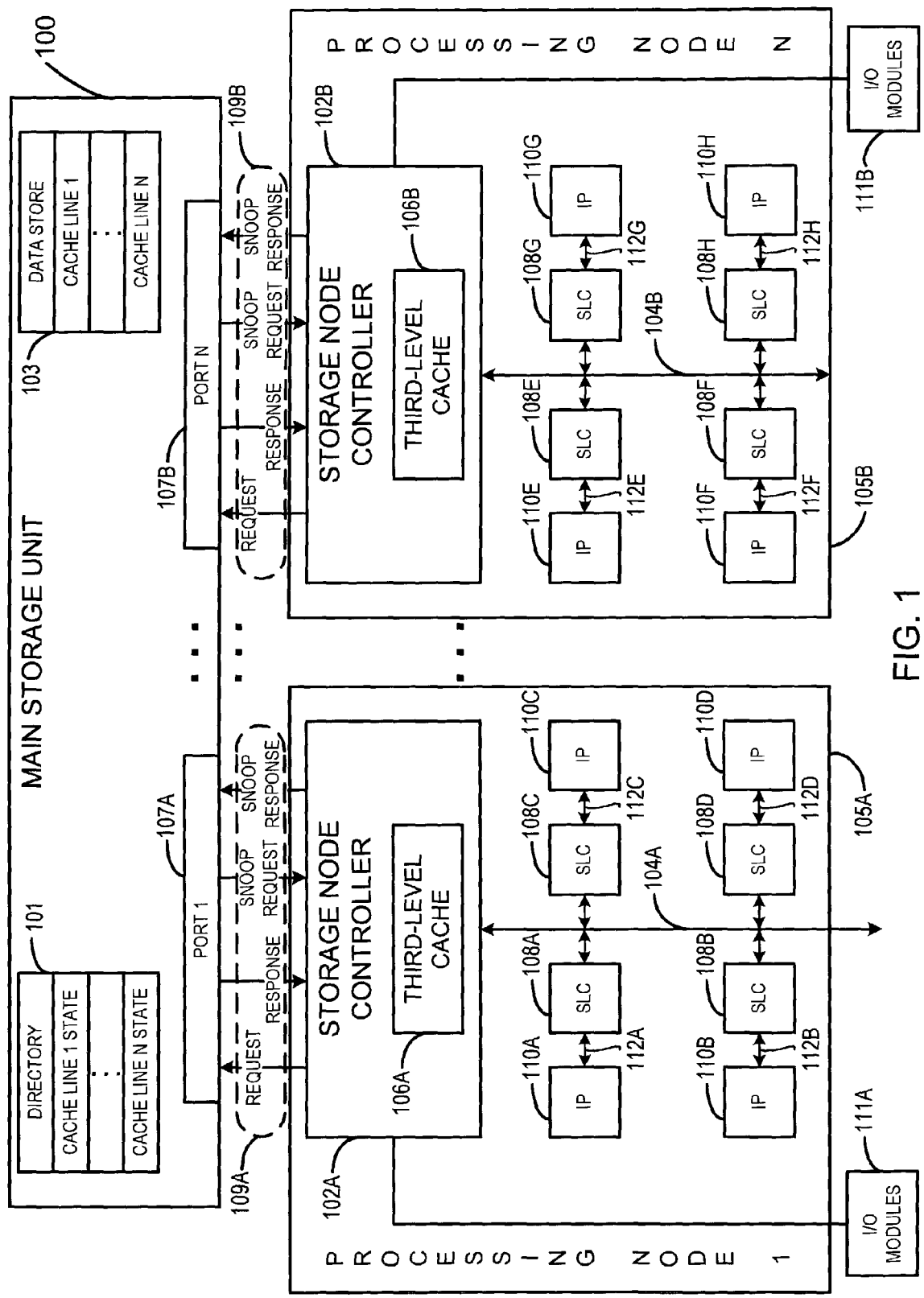
FIG. 1 is a block diagram of an exemplary data processing system that may employ the current invention.

FIG. 1 is a block diagram of an exemplary data processing system that may usefully employ the current invention. The system includes a Main Storage Unit (MSU) 100 that provides the main memory for the system. Although the system of FIG. 1 includes only a single MSU 100, multiple MSUs may be provided, each being mapped to a portion of the system address space in a manner largely beyond the scope of the current application. MSU 100 may include Random Access Memory (RAM), Read-Only Memory (ROM), and/or any other type of memory known in the art.

In one embodiment, MSU is a directory-based storage unit that may be similar to the system described in commonly-assigned U.S. patent application Ser. No. 09/001,598 filed Dec. 31, 1997 entitled "Directory Based Cache Coherency System Supporting Multiple Instruction Processor and Input/Output Caches", incorporated herein by reference. In this embodiment, MSU includes both a directory 101 and a data store 103. Data store 103 stores the data, including the instructions and operands, which may be referenced by any of the processors within the system. Directory 101 stores information that indicates where the latest copy of these data signals resides within the system to ensure that every processor is operating from this copy. As was discussed above, this is necessary since data from data store 103 may be copied into any of the various cache memories within the system.

In the current embodiment, directory 101 includes a directory entry for each 128-byte cache line. Other embodiments may utilize cache lines of different sizes. The cache lines are shown within data store 103 as "cache line 1" through "cache line N". The respectively associated entries within directory 101 are shown as "cache line 1 state" through "cache line N state".

MSU is coupled to one or more processing nodes shown as processing node 1 105A through processing node N 105B. More or fewer processing nodes and memory ports may be included within the system. Each processing node is connected to a different memory port shown as port 1 107A through port N 107B, respectively, via dedicated high-speed interfaces 109A through 109B (shown dashed). Each of these interfaces has four sets of signals, including request, response, snoop request, and snoop response signals. The use of these signals will be discussed below.

Each processing node may also be coupled to an I/O complex, shown as I/O complexes 111A and 111B. Each of these I/O complexes contains one or more industry-standard or proprietary I/O modules that communicate with storage medium such as disk tape subsystems and communication equipment.

Each processing node includes a Storage Node Controller (SNC) shown as SNCs 102A and 102B for processing nodes 1 and N, respectively. Each SNC includes logic that interfaces with a respective high-speed MSU interface 109A or 109B, and further includes logic to interface to a respective one of processor buses 104A and 104B. Each SNC includes a respective ownership cache and all supporting logic. This cache may be a Third-Level Cache (TLC), a Fourth-Level Cache (4LC), or some other type of cache memory. In the embodiment shown, these caches are TLCs 106A and 106B. The ownership caches are discussed further below.

As noted above, each of SNCs 102A and 102B is coupled to a respective processor bus 104A and 104B. These processor buses can utilize any type of bus protocol. Each processor bus interfaces to multiple local cache memories. In the current embodiment, the local cache memories are shown as Second-Level Caches (SLCs) 108A–108H. In another embodiment, these local caches may be Third-Level Caches.

Each SLC 108 is coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. The IP may be any type of processor such as a 2200™ processor commercially available from Unisys Corporation, a processor commercially available from Intel Corporation, or any other processor known in the art. Each IP may include one or more on-board caches. In the current embodiment, each IP may include a First-Level Cache (FLC). Preferably, each IP resides on a single Application Specific Integrated Circuit (ASIC) device with a respective SLC 108. Alternatively, an IP may be coupled to a respective SLC over an external interface.

In general, the caches within the processing nodes are ownership caches. As such, each cache maintains information that describes the state of each of the cache lines resident within the cache. A cache line may be in at least one of four mutually exclusive states, including a modified, exclusive, shared, or invalid state. These states are some-times said to implement a "MESI" protocol. These states indicate the types of access rights that are associated with the cache line data.

When a cache line is stored in the modified state, the cache line copy has been modified, and is therefore the most up-to-copy of the cache line that resides within the system. All other copies of this cache line are said to be "stale", or outdated, and cannot be used, either for read-only or read/write purposes. At any given time, only one cache may store a copy of a particular cache line in the modified state. The cache that stores such a copy is said to "own" the cache line. If another processor requires use of the cache line, it must obtain the updated copy. Until another cache obtains the updated copy, the modified cache line copy may be used for read and/or write purposes by one or more processor associated with the cache that stores the cache line.

When a cache line is retained in the exclusive state, the cache stores the latest cache line copy. Until this cache line is modified, the MSU also stores the latest copy of this data. At any given time, only one cache may store a valid copy of the cache line in the exclusive state. This cache line may be used for read and/or write purposes, and is said to be owned by the cache.

A cache line may further be stored within a cache in a shared state. In this case, the cache line is used for read-only purposes. The cache line may be stored in multiple caches within the system in the shared state. If another cache requests exclusive access to the cache line, all copies of that cache line that exist in the shared state must be "invalidated", or marked as unusable.

Finally, a cache line may reside within a cache in an invalid state. In this case, the cache line has been marked as unusable, and can not be used for read or write purposes. If a cache requires the use of an invalid cache line, it must obtain a valid copy from another memory within the system.

The manner in which memory requests are processed within the system can best be understood by example. Assume IP 110A requires read/write access to a cache line. IP 110A first attempts to retrieve the cache line from its internal cache(s) such as its FLC. If the cache line is not resident within the FLC, a request is sent to the respective SLC 108A. If the requested cache line is likewise not resident within the SLC, the SLC issues a request on the processor bus 104A. In one embodiment of the invention, each SLC implements a bus snoop protocol to monitor the processor bus for such requests. When the request is "snooped" by the SLCs 108B–108D, any SLC that retains the data in the requested state will return the data on processor bus 104A. Similarly, SNC 102A is snooping the bus for such requests. If TLC 106A stores the most recent copy of the cache line in the desired state, the cache line will be returned to the SLC 108A to be forwarded to IP 110A.

In some instances, data requested by IP 110A is not resident in the requested state within any of the cache memories associated with its processor bus 104A. In that case, SNC 102A uses the request signals of interface 109A to forward the request to MSU 100. The request signals include a cache line address, a requester identifier to indicate which processing node or I/O module provided the request, and a transaction identifier for tracking multiple requests from a single node. If the request is of a type that includes data, the write data will also be provided by the request signals. The request signals further include a request type to indicate whether the processing node is requesting the cache line in the exclusive state so that read and write operations may be performed, or whether the cache line is requested in the shared state for read-only purposes. The various request types are discussed below. Finally, the request signals further provide a destination node identifier that is generated by SNC 102A by mapping the request address into the system address space. In an embodiment such as that mentioned above wherein MSU 100 is comprised of multiple memory units, this identifier indicates which of these units is to receive the request.

After receiving the request, MSU 100 determines the location and state of the most recent copy of the cache line using the cache line state information stored within its directory 101. In the current embodiment, directory 101 indicates that a cache line is in one of a number of predetermined states that include, but are not limited to, the following:
MSU Own;
Exclusive; and
Shared.

MSU Own State

All cache lines in the MSU are placed in the MSU own state after system initialization and before any cache lines have been copied into one of the system caches. This state indicates that the MSU has the most recent copy of the cache line. Since only the MSU is considered to have a valid copy of any cache line that is in the MSU own state, an error occurs if any SNC 102A issues a request to write to a cache line that is in this state.

Exclusive State

This state is described above in reference to the MESI protocol. When MSU 100 grants a copy of a cache line to a processing node for read and/or write purposes, directory 101 records the processing node's identity, and indicates the cache line is held in the exclusive state. Once a cache line is granted in an exclusive state, the copy retained by the MSU may not be provided to another processing node. If the MSU receives another request for the cache line while it is in this state, the MSU must retrieve the cache line copy from the owner by issuing a snoop request, as will be discussed below.

Shared State

This state is described above in regards to the MESI protocol. In this state, the cache line may reside within one, several, or all of the caches in the system at once for read-only purposes. The MSU is still considered to have a valid copy of the cache line, which may be provided to another cache for read-only purposes. Directory 101 records which one or more of the processing nodes have a valid copy of the cache line.

Returning to the current example, if the cache line is resident within MSU 100 in the MSU own state, MSU provides this data directly to processing node 1 105A over the response lines of interface 109A. These lines include data signals, the original requester id, the transaction id, and a response type. The transaction id is the same as that included with the original request, and is used by the SNC 102A to match the request to the response. The response type indicates whether the cache line is being provided in the exclusive or the shared state. The MSU delivers the cache line in the state that was indicated on the request lines, which, in the current example, is the exclusive state. MSU further updates directory 101 to record that processing node 1 105A retains the cache line copy in the exclusive state.

The foregoing discussion assumes the cache line is available within MSU 100 in a state that allows its immediate return to the requester. Assume, instead, that the cache line state information stored within directory 101 indicates that the cache line is retained in the exclusive state by processing node N 105B. The MSU is therefore not able to provide the cache line directly to processing node 1 105A, but instead must issue a snoop request to node N to prompt the return of any updated cache line data to MSU 100.

A snoop request is issued to processing node 105B from port N 107B across the snoop request lines of interface 109B. These signals include a cache line address, a snoop type, a source and destination identifier, and a transaction tracking identifier. The snoop type indicates the type of snoop request being issued, the destination identifier indicates the processing node that is to receive the request, and the transaction tracking identifier is an identifier generated within MSU 100 that is used to later match a snoop response to the snoop request.

Upon receiving the snoop request, directory state information stored within TLC 106B is used to determine whether any of the SLCs 108E–108H has a copy of the data. If not, SNC 102B may return the cache line directly to MSU 100. This return of ownership and data is issued across the snoop response lines of interface 109B. The snoop response lines include cache data signals, response type signals, and the transaction-tracking id that was provided with the snoop request. If, however, any of the SLCs 108E–108H retains a copy of the cache line, SNC 102B issues a request to each of the SLCs 108E–108H via bus 104B requesting return of ownership and any modified data. This request is snooped by SLCs 108E–108H such that any of these SLCs having a valid data copy will invalidate that copy, and will further invalidate any copy stored by the associated FLC. If any one of these SLCs had acquired exclusive ownership of, and subsequently modified, the data, that modified copy is returned to SNC 102B during a "write back" operation. If the data is not modified, only ownership is returned. SNC 102B then returns ownership and, if necessary, modified data to MSU 100 using a snoop response, as discussed above.

After the snoop response is forwarded to MSU 100, MSU routes any returned data from port N 107B to port 1 107A via a port-to-port interface (not shown in FIG. 1). The data, which is modified, and is therefore the most up-to-date copy of the cache line, is provided to processing node 1 via interface 109A. If data is not returned with the snoop response, the data is obtained from data store 103 and provided to processing node 1 105A.

When SNC 102A receives the cache line data, it provides this data in the exclusive state to requesting IP 110A via SLC 108A so that execution may continue. IP 110A and SLC 108A now own this cache line. State information within TLC 106A records that processing node 105A retains a copy of this cache line in the exclusive state.

As is apparent from the foregoing discussion, obtaining requested data may be time-consuming. In the foregoing example, IP 110A issues a request for an exclusive copy of data that is resident in SNC 102B or one of the associated SLCs 108E–108H. This request is fulfilled by invalidating the copies of data stored within processing node N 105B, then transferring the data from processing node N 105B to processing node 105A. The time required to complete these operations may be significant, especially during times when system interfaces are experiencing heavy traffic. The time required to fulfill the request is even greater in those instances wherein the snoop response does not include data. As discussed above, in these cases, another reference to data store 103 must be made to obtain the data.

According to the current invention, a system and method is provided that eliminates the need to make a reference to data store 103 when a snoop response is returned to the MSU without data. A read buffer is provided to temporarily store a cache line that is read from data store 103 during the initial reference. The read buffer stores data for any request that will require a snoop request to complete. If the snoop request is returned without modified data, the buffered data may be returned directly to the requester, making the additional reference to data store 103 unnecessary. The details associated with the current system and method will be discussed below in reference to the following figures.

Figure 2:
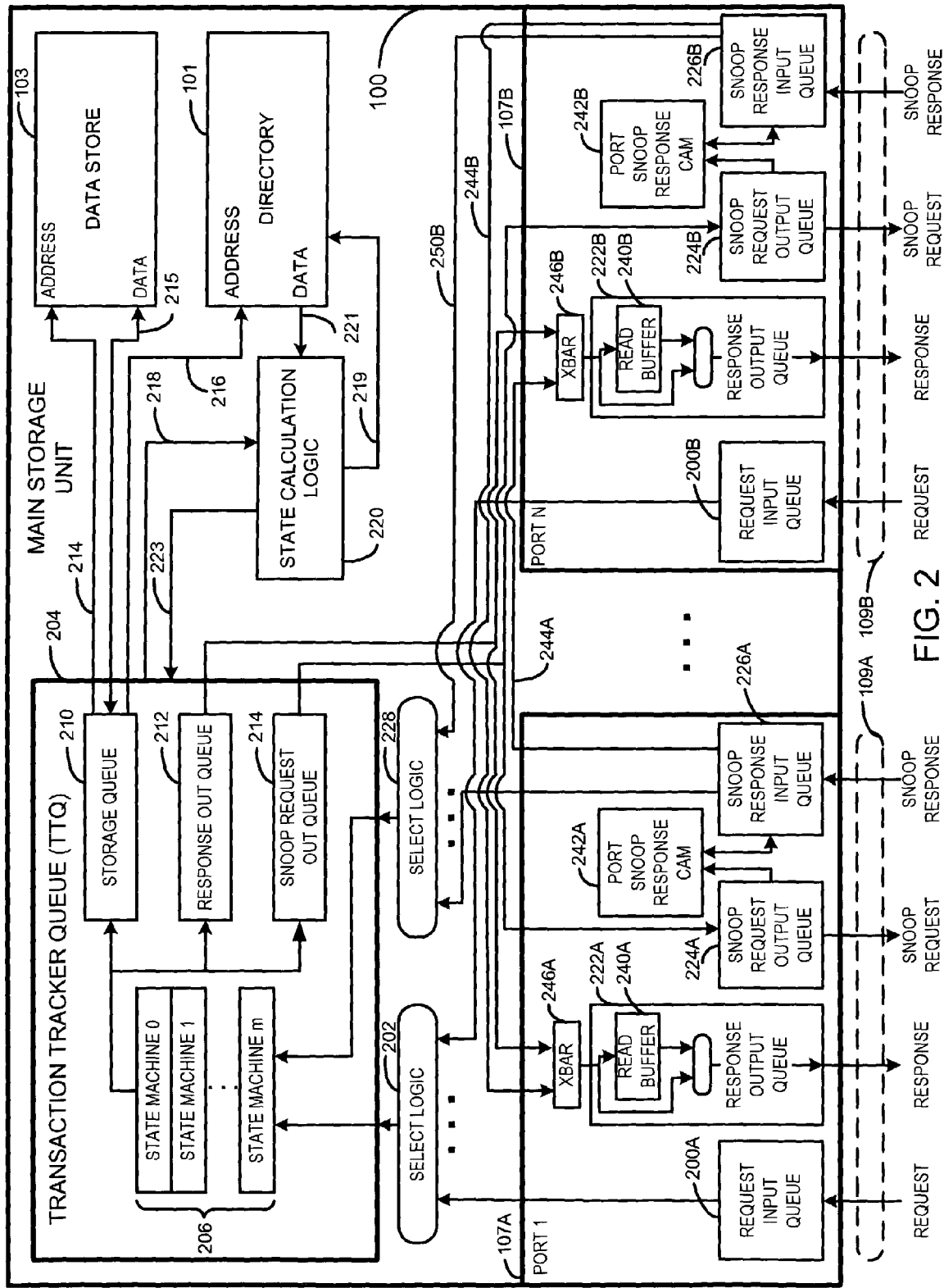
FIG. 2 is a block diagram of the current invention.

FIG. 2 is a more detailed view of MSU 100. As discussed above, each processing node 105 is coupled to the MSU via a high-speed interface (shown dashed). Interface 109A connects processing node 1, 105A, to port 1, 107A of MSU 100. Similarly, interface 109B couples processing node N, 105B, to port N, 107B, of the MSU. Each of these interfaces includes request, response, snoop request and snoop response lines, as discussed above.

Each of the ports includes a respective request input queue. A request from a processing node is provided across interface 109 and is stored within the request input queue of the respective port. For example, a request that is provided by processing node 105A over interface 109A will be stored temporarily in request input queue 200A of port 1, 107A. Similar queues are included within each port. Each request input queue is capable of storing multiple requests that are waiting to be processed by MSU 100.

The request input queues may each provide a stored request to select logic 202. Select logic includes logic that selects one of the pending requests based on a rotational fairness algorithm. The selected request is then stored within Transaction Tracker Queue (TTQ) 204. In one embodiment, a new request may be stored within TTQ 204 each clock cycle.

The TTQ 204 includes multiple state machines 206 shown as state machine 0 through state machine m. A state machine is provided for each request that may be stored within TTQ 204. When a new request is stored within TTQ 204, the respective state machine is activated to track processing activities and to control the use of these TTQ queues for that request. Processing activities are tracked using a unique TTQ identifier generated by TTQ 204 and assigned to the request. This TTQ identifier is used to track the request as long as it is stored within the TTQ 204, as will be discussed below.

Each state machine is coupled to several queues, shown as storage queue 210, response out queue 212, and snoop request out queue 214. Upon activation of a state machine for a request, the state machine logic generates a request entry within storage queue 210 that includes a request address, a request type, and any data provided with the request. The storage queue processes these request entries in a First-In, First-Out (FIFO) manner. When a request gains priority, the request address and any data are provided to data store 103 on lines 214 and 215, respectively. Also at this time, the request address is provided on lines 216 to directory 101.

When a request is provided to data store 103, a full cache line of data will be read from, or written to, data store based on the request type. In the mean time, the address on lines 216 reads the cache line state information for the addressed cache line from directory 101. This information is provided to state calculation logic 220 on lines 221, which forwards that information to TTQ 204 on lines 223 for use in fulfilling the request.

In addition to being forwarded to TTQ 204, the cache line state information is further used by state calculation logic 220 to determine the next state for the cache line. This next state is based, in part, on the request type provided by TTQ 204 on lines 218, on existing state information stored within directory 101, and, in some instances, on a response type that is provided with a snoop response, as will be discussed below. State calculation logic 220 then writes the updated cache line state back to directory 101 on lines 219. It may be noted that while the state calculation logic 220 is shown to interface with directory 101 via separate uni-directional lines 221 and 219 to emphasize the read-modify-write nature of the operation performed by this logic, this logic may also be implemented using a single bi-directional interface. The calculation of cache line state information by state calculation logic 220 is largely beyond the scope of the current invention. Details associated with state calculation are provided in commonly assigned U.S. patent application entitled "System and Method for Providing Speculative Ownership of Cached Data Based on History Tracking", Ser. No. 10/304,919 filed on Nov. 26, 2002.

TTQ 204 uses the state information provided on lines 223 in conjunction with the request type of the current request to determine whether an MSU-initiated snoop request is necessary to fulfill the current request. In some cases, the request may be fulfilled without issuing additional snoop requests. This is the case, for example, when the request is a type that stores data to data store 103. In this instance, a response is provided to the requesting processing node indicating that the operation is completed. In another scenario, an additional snoop request is unnecessary when a requested cache line is to be returned in the shared state, and the cache line state information indicates the cache line is in the MSU own or the shared state. In another case, a response may be returned to the requesting processing node without issuing a snoop request when a cache line is to be returned in the exclusive state, and the MSU owns the cache line. In still another scenario, the requested cache line may be returned if the directory state indicates that the cache line is already owned by the requesting processing node. This latter situation may occur, for example, if the requesting node had previously obtained the cache line in the exclusive state, had never modified it, but instead had invalidated it without notifying the MSU.

When it is determined that a response may be returned to the requesting processing node without issuing a snoop request, TTQ generates the response using the cache line state information. As discussed above, this response includes the original transaction identifier provided with the request, any requested data, and a response type. If data is returned, this response type indicates whether the data is being provided in a shared or exclusive state. This response is stored within response out queue 212, and will be transferred to the appropriate port so that it may be forwarded to the processing node that initiated the request. In the current example, the response is transferred to response output queue 222A of port 1 107A. This response is then forwarded to processing node 1, 105A, when it gains priority.

After a response has been queued within the appropriate one of the response output queues and subsequently released to the corresponding interface 109, and further after any memory updates have occurred, the respective one of state machines 206 indicates that the request processing is completed. The request is removed from TTQ 204 such that another request may be received in its place.

The foregoing scenarios relate to situations in which requests can be fulfilled without issuing snoop requests. In other cases, a snoop request must be issued to another processing node before a response may be issued to the original requester. This occurs, for example, when the MSU cannot return the cache line in the required state. For example, if the request type indicates, or if state calculation logic 220 determines, that the cache line should be returned in the exclusive state, and if the only valid copy of the cache line resides within another processing node, an MSU-initiated snoop request must be generated. This request is issued to invalidate the cache line copy residing within that other processing node, and to prompt the return of any modified data.

If a snoop request is necessary, TTQ 204 generates the request, which is stored within snoop request out queue 214. This request includes the TTQ identifier generated by TTQ 204, a snoop request type, and an address. The request is transferred to the snoop request output queue(s) of the appropriate port(s) based on the processing node(s) that have a copy of the requested cache line. In the current example, it will be assumed that processing node N 105B owns the requested cache line. The snoop request is therefore transferred to snoop request output queue 224B of port N 107B. A similar snoop request output queue is provided for each of the other ports. This snoop request is transferred to SNC 102B to be processed in the manner discussed above.

According to the current invention, when a snoop request is transferred to the snoop request output queue 224B, snoop request output queue generates an entry within the associated port snoop response CAM 242B. A similar port snoop response CAM 242A is provided for port 1 107A. Additional ports will include similar CAMs. The entry within the port snoop response CAM includes the TTQ identifier generated by TTQ 204. Use of this identifier will be discussed further below.

Sometime after the snoop request is stored within snoop request output queue 224B, it will be issued to the associated processing node N 105B. This snoop request includes the requester identifier that was provided with the original request and that indicates the processing node or I/O module that initiated the request. The snoop request also includes the transaction identifier included with the original request.

Approximately around the time TTQ initiates the snoop request, TTQ 204 provides the cache line data that was obtained from data store 103 to the port that is associated with the requesting processing node. This data is stored within a provisional read buffer for this port. For example, port 1, 107A, included read buffer 240A, and port 2, 107B, includes read buffer 240B. In the current example, data read from data store 103 will be stored within read buffer 240A for requesting processing node 105A. The requester identifier, transaction identifier, and response type information are also stored within this read buffer along with the data. This packet of information comprises a provisional response that may be used to provide a response to processing node 105A. The type of snoop response that is received from processing node 105B will determine whether this provisional response will be released to the requester, as will be discussed below.

Sometime after the snoop request is issued to processing node N 105B, processing node N will return a snoop response to snoop response input queue 226B of port N 107B. The original requester and transaction identifiers are returned in the snoop response along with a response type, as will be discussed further below. This snoop response will be presented by the snoop response input queue to port snoop response CAM 242B.

In this exemplary embodiment, port snoop response CAM 242B is a content addressable memory, although other types of storage addresses may be used for this purpose. The transaction identifier returned in the snoop response is used to address port snoop response CAM 242B to obtain the entry that was associated with the snoop request. As noted above, this CAM entry stores the TTQ identifier assigned to the original request. This TTQ identifier is routed along with the snoop response to the port associated with the original requester, as is determined by the requester identifier returned with the snoop response. Recall that this snoop response includes the requester and transaction identifiers, response type, and the response data.

In the current example, the requester identifier will indicate that processing node 1, 105A is the original requester. Therefore, snoop response input queue 226B will route the snoop response along with the TTQ identifier to port 1 107A on lines 244B. After the snoop response is received by port 1 107A, Xbar logic 246A routes the response to the response output queue 222A. Response output queue 222A determines from the snoop response whether data was returned with that response. If so, response output queue 222A will propagate the response to processing node 105A. The TTQ identifier provided with the snoop response is used to locate an entry stored within read buffer 240A having the same TTQ identifier. This entry stores the provisional response containing the cache line data previously retrieved from data store 103. The provisional response is discarded in this case, since data provided with the snoop response was returned to the requester. If, however, data is not returned with the snoop response, response output queue 222A enables the release of the provisional response to the requester. Use of this provisional response eliminates the need to retrieve the response data from data store 103, thereby accelerating response completion.

As noted above, each response includes a response type. Among other things, the response type indicates whether cache line data that is being returned to the requester is being provided in the shared or the exclusive state. If the provisional response is released to the requester, the response type included with the provisional response is provided to the requester to indicate this cache line state. If, however, the snoop response is released to the requester, the response type included with this snoop response is used to indicate to the requester the state of the returned cache line.

A response type that is included with the provisional response is generated by response out queue 212 based on the request type and on the cache line state information stored within the directory and forwarded to TTQ 204 on lines 223 by state calculation logic 220. In contrast, a response type included with the snoop response may be based not only on the request type and the cache line state information, but may further be determined by decisional logic within a processing node such as processing node 105B. For example, in some instances, when a snoop request is issued to facilitate the return of a cache line, the previous owner of a requested cache line is allowed to determine whether to retain a shared copy of the cache line, or to instead invalidate all of its retained copies. If the former action is taken, modified data provided with the snoop response must be forwarded to the requester in the shared state, otherwise, the data may be provided to the requester in the shared or exclusive state. The response type returned with the snoop response will indicate which of these actions is being taken. This response type will be routed along with the snoop response to the port associated with the requester, and will be released to the requester by the response output queue 222A if the snoop response includes modified data. Otherwise, the response type included with the provisional response is released to the requester, as noted in the foregoing paragraph. More details associated with the generation of a response type in conjunction with the determination of a next cache line state are provided in commonly-assigned U.S. patent application entitled "System and Method for Providing Speculative Ownership of Cached Data Based on History Tracking", referenced above.

Returning to the current example, at approximately the same time snoop response input queue 226B provides the snoop response on lines 244B to port 1 107A, the snoop response is also provided to select logic 228. Select logic 228 selects one of the pending responses for presentation to TTQ 204 using a rotational fairness algorithm. The selected snoop response will be assigned to the state machine that is still processing the initial request using the TTQ identifier that was included with the snoop request and returned with the snoop response. In response, the state machine generates a request entry within storage queue 210. This request, which will be processed on a FIFO basis as discussed above, will store any updated data that was provided with the snoop response to data store 103.

After updated data is stored to data store, an additional 'completion' response is issued to the original requester. The completion response is provided to notify the requester that the modified data has been successfully stored within the MSU, and the requester may therefore discontinue the tracking of the request. Until the requester receives this completion response, the requester must track the request. This ensures that the updated data is successfully written to data store 103. It may be noted that the requester is notified of the need to track the updated data by the response type provided with the initial response. In cases where unmodified data is returned with the initial response, this additional completion response is not needed, and the requester can cease request tracking upon receipt of this initial response.

Processing of this request will also cause cache line state information to be read from directory 101 onto lines 221. As discussed above, state calculation logic 220 uses the current cache line state information as well as the request type and the snoop response type provided by TTQ 204 on lines 218 to update the cache line state information. Details associated with the updating of the state information are largely beyond the scope of the current invention, and are provided in the commonly assigned application entitled "Directory Based Cache Coherency System Supporting Multiple Instruction Processor and Input/Output Caches" referenced above.

After the modified data has been stored to data store 103, the cache line state information has been updated, and the additional completion response is issued to the requester, the original request is removed from TTQ 204. This allows TTQ 204 to receive another request from one of the ports based on the fairness algorithm practiced by select logic 202.

The current invention provides a mechanism for accelerating the return of data to the requester. In prior art systems, if data is not returned with the snoop response, a second reference must be made to data store 103 before the response can be provided to the requester. The current system allows a response to be returned to a requester without this additional data store reference, regardless of whether a snoop response returns data. In most cases, this response can be provided even before the previous owner's snoop response is forwarded to TTQ 204.

In the current embodiment, the issuance of a response by one of the response output queues 222 must be timed to avoid "conflicts". In this context, conflicts are situations that involve operations to the same cache line that, if completed in an incorrect time order, may result in the loss of data updates. The various types of conflict situations that must be handled by the current invention are discussed in turn in the following paragraphs.

A first type of conflict situation may best be considered by returning to the previous example. Assume that SNC 102B of processing node N 105B is returning a cache line including updated data to MSU 100. This will be accomplished using a port memory write (PMW) request. Further assume that after the processing node issues the PMW request, a snoop request is received for the same cache line. Since the SNC 102B has already returned updated cache line data and ownership rights with the previously issued PMW request, the SNC will generate a snoop response that does not include data.

As discussed above, when a snoop request does not include data, a response is generally issued using cache line data stored within read buffer 240A. However, in this situation, the data stored within read buffer 240A is not the most recent copy, since the most up-to-date data copy is in the process of being returned to the MSU as the result of the PMW request. Some mechanism is therefore needed to ensure that the PMW request is processed by TTQ 204 before the snoop response is processed so that a current copy of cache line data is returned with the response to processing node 105A.

In the foregoing embodiment, this conflict situation is addressed by using the SNC to throttle the return of snoop responses. In the current example, SNC 102B tracks that an outstanding PMW request has been issued to MSU 100 for a particular cache line. If SNC 102B receives any subsequent snoop request for this same cache line, the SNC will not immediately issue the snoop response. Instead, SNC 102B will wait until it has received an acknowledgement from MSU 100 that the PMW request has been completed successfully. When received, this acknowledgment will release the SNC 102B to issue a snoop response that does not include data. It may be noted that this acknowledgment is similar to the additional completion response that is returned to the requester following the modification of cache line data within data store 103, as discussed above.

While SNC 102B is waiting for the acknowledgement, the PMW request is processed as follows. The request is received within request input queue 200B of port N 107B. It will be provided to select logic 202, and will enter TTQ 204 in the manner discussed above so that a state machine is activated for the PMW request. When it enters TTQ 204, the cache line address provided with the request will be compared to the cache line address associated with every other pending request stored within the TTQ. If two requests are associated with the same cache line, a potential conflict situation exists which must be resolved.

In the current example, a conflict will be detected between the address associated with the PMW request and the entry associated with the original read request. In response to this conflict detection, the state machine processing the original request will set a state bit indicating the existence of the PMW request. The state machine will set an indicator that causes response out queue 212 to remove the data entry from read buffer 240A. This entry contains outdated cache line data that must not be returned with the response. The state machine indicator will also cause response out queue 212 to update the corresponding entry within port snoop response CAM 242B so that the entry indicates that there is no longer any provisional data entry available within read buffer 240A. This will inhibit any port-to-port response acceleration when the eventual response without data is provided by SNC 102B to the MSU. The appropriate entries in the read buffer 222A and response CAM 242B are identified using the TTQ identifier stored with each entry.

In a manner similar to that described above, the state machine that is assigned to the PMW request will generate a request within storage queue 210. When the request is processed, the updated data will be written to the data store. Additionally, state information for the cache line will be read from directory 101 and provided to state calculation logic 220. The state calculation logic utilizes the snoop response type, the original request type, and the current state data to generate a next state for the cache line. This updated state information will be stored back to directory 101 on lines 219.

After the PMW request has been completed, a PMW response is entered into response out queue 212. This completion response is transferred to response output queue 222B, and will be routed to SNC 102B. This response provides an acknowledgement to SNC 102B indicating that the PMW operation has been completed. This acknowledgement releases the SNC to process the snoop request. SNC 102B generates a snoop response that does not include data. The response indicates that the requested cache line is no longer held by the SNC. This response is provided on lines 109B to snoop response input queue 226B, and is presented to port snoop response CAM 242B. Because the response CAM entry has been updated to indicate no provisional data is available in an output port, no accelerated port-to-port response is provided to processing node 105A.

The snoop response is provided on lines 250B to TTQ 204. The TTQ identifier provided with the snoop response will be used to match this response to the state machine that is processing the original read request. As noted above, this state machine includes an indicator that was activated to record the existence of the previous conflict, and to indicate that read buffer 240A no longer stores cache line data to complete the response. The state machine therefore generates a request within storage queue 210 to read the cache line data from data store 103. When this request is processed, the most recent copy of the cache line data will be retrieved from data store 103 and used by TTQ 204 to generate a response in response out queue 212 in the manner discussed above. This response will be forwarded to response output queue 222A so that it may be transferred to processing node 105A in the manner discussed above. State calculation logic 220 will also update the cache line state information, if necessary, based on the snoop response type.

The foregoing paragraphs describe one mechanism for handling conflicts between a PMW request and a previously received read request. In another embodiment of the invention, detection of this type of conflict will cause the state machine processing the read request to transfer updated data that is provided with the PMW request to read buffer 240A. The PMW request is then completed by storing the updated data to data store 103 in the manner described above. The PMW response is issued to SNC 102B so that the SNC can respond to the snoop request. SNC 102B generates a snoop response without data, which is returned to snoop response input queue 226B via interface 109B. Snoop response input queue 226B forwards the snoop response and the TTQ identifier retrieved from port snoop response CAM 242B to response output queue 222A on lines 244B. Response output queue 222A is able to release a response to processing node 105A using the updated data, response type, and ID fields stored within read buffer 240A.

In the alternative embodiment, the snoop response will also be routed from snoop response input queue on lines 250B to TTQ 204, where it will be used to generate a request within storage queue 210. Although this request will not result in the updating of data within data store 103, it may result in the updating of the cache line state stored within directory 101. When the request is selected from storage queue 210 for processing, the cache line address will be provided from storage queue 210 to directory 101. State information for the cache line is read onto lines 221, and is provided to state calculation logic 220 so that the cache line state can be updated in the manner discussed above. It may be noted that the newly generated cache line state will correspond to the state that is indicated by the response type that was provided in the response to processing node 105A. For example, if a response type indicates the data was provided in the exclusive state, the new state information that is being stored within directory 101 will likewise indicate the cache line is now in the exclusive state, and so on.

The above description discusses one type of conflict that occurs between a pending read request that has already been presented to data store 103 and a subsequently received PMW request. A related conflict may be detected between a pending read request that has not yet been presented to data store 103 and a subsequently received PMW request. This conflict will be detected by comparing the cache line address provided with the PMW request to the addresses associated with all other requests that are pending within TTQ 204. When the conflict is detected, the read request will be "deferred", meaning that processing of this request will be temporarily delayed until after the PMW request is completed such that the updated data is written to data store 103. The read request can then be processed. When this occurs, the most recent cache line copy is read from data store 103. This data is used to generate a response without the need to issue a snoop request. This response will be generated within response out queue 212, and will be directed to response output queue 222A so that it can be transferred to processing node 105A in the manner described above.

Yet another type of conflict must be addressed within the context of the current invention. Assume that as a result of an original read request issued by processing node 105A, a snoop request is issued to processing node 150B. In response to the snoop request, processing node 105B returns a snoop response that includes updated data. This snoop response is transferred from snoop response input queue 226B to response output queue 222A, and is forwarded to processing node 105A. Within processing node 105A, the cache line will be forwarded to a requesting IP 110, which may modify, then flush, the cache line back to the MSU using a PMW request.

While the cache line data is being modified within processing node 105A, the snoop response that is stored within snoop response input queue 226B may be forwarded to TTQ 204. The snoop response will be matched with the state machine processing the original request using the TTQ identifier. This snoop response may be forwarded to TTQ 204 before, or after, TTQ 204 receives the PMW request from processing node 105A.

Although TTQ may receive the PMW request and snoop response in any order, the snoop response cannot be presented to data store 103 after the PMW request is processed or the most recent copy of the data will be overwritten. To prevent this situation, TTQ 204 detects that the snoop response and PMW request are directed to the same cache line address. In response, TTQ discards the snoop response, and the state machine that is processing this response is considered available to accept another request. The PMW request is processed so that the most recent copy of the cache line data is stored to data store 103.

Figure 3:
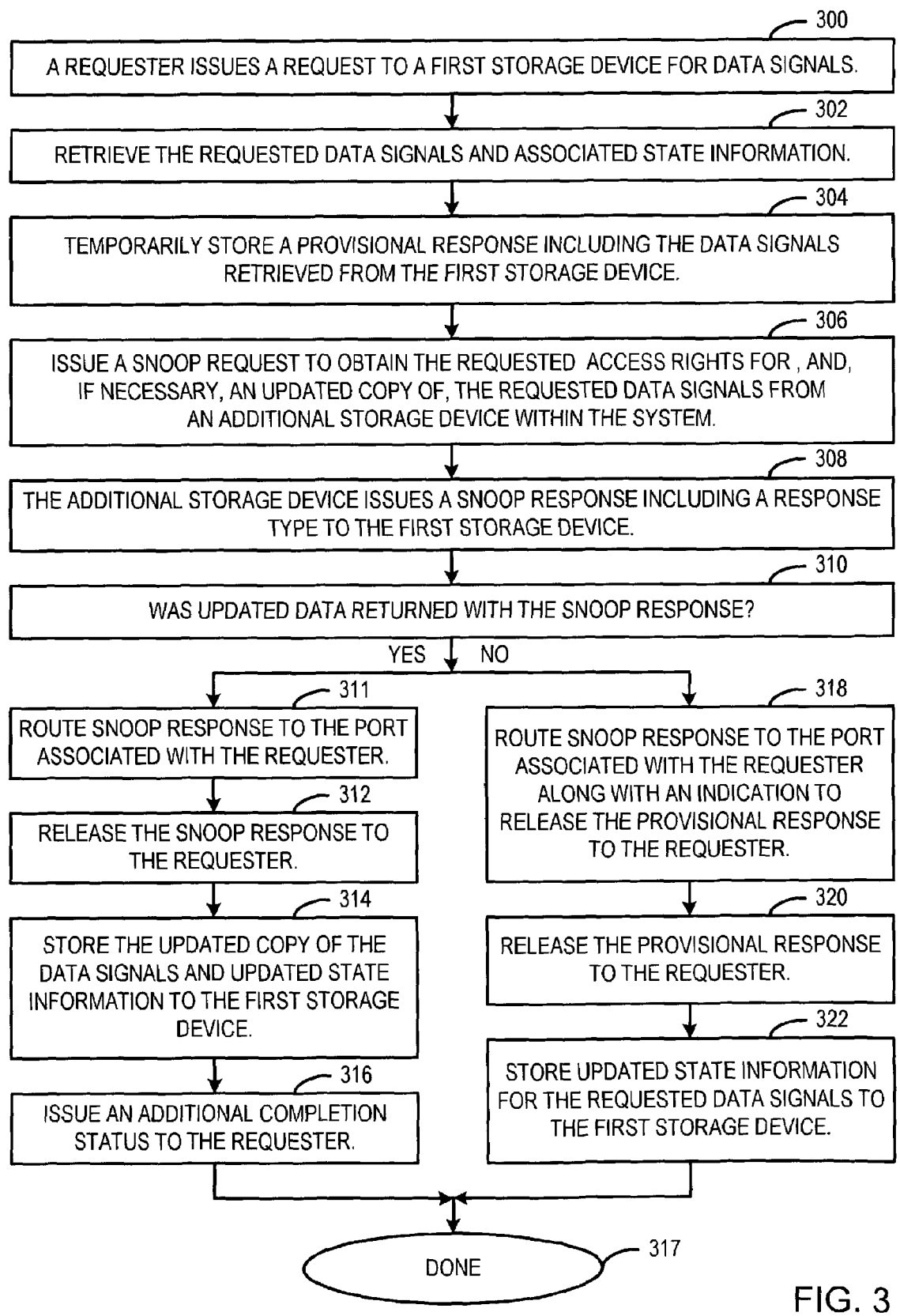
FIG. 3 is a flow chart of one embodiment of a method according to the current invention.

FIG. 3 is a flow chart of one embodiment of a method according to the current invention. The method is initiated when a requester issues a request for data signals to a first storage device such as MSU 100 (300). This causes the first storage device to retrieve data signals and state information describing those data signals (302). A provisional response including the retrieved data signals is stored temporarily (304). The provisional response may be stored in any storage device including a memory buffer such as read buffer 240A or 240B. Based on the state information retrieved with the data signals, a snoop request is issued to obtain access rights for, and if necessary, an updated copy of, the requested data signals from an additional storage device within the data processing system (306). This additional storage device may be a cache memory, for example.

Eventually, the additional storage device will provide a snoop response to the first storage device in response to the snoop request (308). The snoop response will contain a response type indicating the type of access rights being returned for the requested data. It will be determined whether updated data is provided with this response (310). If so, the snoop response including the updated data and the response type is routed to a port of the first storage device that is associated with the original requester (311). The snoop response is then released to the requester and the provisional response is discarded (312). In addition, an updated copy of the data and state information for the updated data is stored within the first storage device (314). An additional completion status is issued to the requester so that the requester can discontinue request processing (316). The request processing is then considered complete (317).

Returning to decision step 310, if the snoop response does not include updated data, the snoop response is routed to the port associated with the original requester along with an indication to trigger the release of the provisional response to the requester (318). The provisional response is released to the requester (320), and updated state information is stored within the first storage device (322). Request processing is then considered complete (317).

The current invention provides a mechanism for returning data that is shared between multiple processors to a requester in an expedited manner. The invention eliminates the need to access data store 103 after the snoop response is received, thereby reducing overall response times. It will be understood that the embodiments and formats described above are merely exemplary and many other alternative embodiments are possible. The scope of the invention is therefore indicated only by the claims that follow rather than by the foregoing description.

What is claimed is:

1. A data processing system, comprising:
a main memory;
a requester coupled to the main memory to make a request for data signals stored in the main memory;
at least one storage device coupled to the main memory;
a circuit in the main memory to temporarily buffer the data signals after the data signals are retrieved from the main memory but before it is determined whether an updated copy of the data signals exists, the circuit to issue a request from the main memory to determine whether any of the at least one storage device stores the updated copy of the data signals, and if so, to obtain and provide the updated copy to the requester, otherwise to return the data signals that were buffered to the requester.

2. The system of claim 1, wherein the circuit includes logic to provide access rights for the data signals to the requester.

3. The system of claim 2, wherein the access rights are selected from a set of access rights consisting of exclusive access rights and shared access rights.

4. The system of claim 2, wherein at least one additional requester is coupled to the main memory, and wherein the circuit includes a snoop request circuit to issue a snoop request to one or more of the additional requesters, the snoop request requesting return of the access rights for the data signals.

5. The system of claim 4, wherein the snoop request further requests the return of any updated copy of the data signals.

6. The system of claim 5, wherein the circuit includes a snoop response circuit to receive any updated copy of the data signals from any of the one or more additional requesters.

7. The system of claim 4, and further including a storage device coupled to the circuit to store directory signals describing the data signals.

8. The system of claim 7, wherein the circuit includes logic to determine, based the directory signals, which of the access rights to request from the one or more additional requesters.

9. The system of claim 7, wherein the circuit includes logic to determine, based on the directory signals, which of the one or more additional requesters are to be issued one of the snoop requests.

10. A method of managing data signals stored within a storage device of a data processing system, comprising:
   a.) making a request for ones of the data signals;
   b.) retrieving the requested data signals from the storage device before it is determined whether an updated copy of the data signals exists;
   c.) temporarily retaining the requested data signals within the storage device;
   d.) issuing a snoop request from the storage device to determine whether an updated copy of the requested data signals exists; and
   e.) in response to the request for the data signals, providing the updated copy if the updated copy exists, otherwise, providing the requested data signals that were temporarily stored.

11. The method of claim 10, wherein one or more additional storage devices are coupled to the storage device, and wherein step d.) includes issuing a snoop request to at least one of the additional storage devices that may store the updated copy.

12. The method of claim 11, wherein the snoop request includes a request to return access rights for the requested data signals.

13. The method of claim 12, and further including determining, based on a request type provided with the request for the data signals, which of the access rights are to be requested for return.

14. The method of claim 13, and further including:
   obtaining state information for the requested data signals; and
   determining, based on the state information, which of the access rights are to be requested for return.

15. The method of claim 12, and further including:
   retaining, by the at least one of the additional storage devices, shared access rights to the requested data signals;
   returning an updated copy of the requested data signals to the storage device; and
   providing the updated copy along with shared access rights in response to the request.

16. The method of claim 12, and further including:
   invalidating, by the at least one of the additional storage devices, all copies of the requested data signals;
   returning an updated copy of the requested data signals to the storage device; and
   providing the updated copy along with predetermined access rights in response to the request.

17. The method of claim 16, and further including
   obtaining state information for the requested data signals; and
   determining, based on the state information, the predetermined access rights to provide with the updated copy.

18. The method of claim 15 or 16, and further including storing the updated copy to the storage device.

19. The method of claim 18, and further including:
   generating state information for the updated copy; and
   storing the state information for the updated copy in the storage device.

20. A data processing system, comprising:
   a main memory to store data signals;
   multiple cache memories coupled to the main memory to store any of the data signals retrieved from the main memory;
   a requester coupled to the main memory to request ones of the data signals;
   a storage device within the main memory, wherein the requested data signals are retrieved from the main memory and stored in the storage device before it is determined whether an updated copy of the requested data signals is stored in any of the multiple cache memories;
   a snoop request circuit coupled to the storage device to make a request from the main memory to an identified one of the multiple cache memories to return any updated copy of the requested data signals; and
   a response circuit coupled to the storage device to provide to the requester any returned updated copy of the requested data signals, or if no updated copy is returned, to instead provide the requested data signals stored by the storage device.

21. A data processing system, comprising:
   data storage means for storing data signals;
   requesting means for making a request to cause ones of the data signals to be retrieved from the data storage means before it has been determined whether a valid modified copy of the data signals exists;
   buffer means in the data storage means for storing the retrieved data signals;
   means for issuing a request from the data storage means to retrieve the valid modified copy of the retrieved data signals; and
   response output means for providing the valid modified copy to the requesting means, and, if the valid modified copy does not exist, for providing the retrieved data signals stored by the buffer means to the requesting means.

* * * * *